United States Patent [19]

Jötten et al.

[11] Patent Number: 4,484,128
[45] Date of Patent: Nov. 20, 1984

[54] VECTOR CONTROL SYSTEM FOR AC MOTOR DRIVES

[75] Inventors: Robert H. Jötten, Darmstadt; Gerhard U. Mäder, Wehrheim, both of Fed. Rep. of Germany

[73] Assignee: Westinghouse Electric Corp., Pittsburgh, Pa.

[21] Appl. No.: 480,194

[22] Filed: Mar. 30, 1983

[30] Foreign Application Priority Data

Apr. 2, 1982 [DE] Fed. Rep. of Germany ....... 3212439

[51] Int. Cl.$^3$ ............................................. H02P 5/40
[52] U.S. Cl. ..................................... 318/805; 318/803
[58] Field of Search ................ 318/803, 805, 807–811, 318/812

[56] References Cited

U.S. PATENT DOCUMENTS

| | | | |
|---|---|---|---|
| 3,671,831 | 6/1972 | Chausse et al. | 318/800 |
| 3,824,437 | 7/1974 | Blaschke et al. | 318/803 |
| 3,989,991 | 11/1976 | Brennen et al. | 318/805 |
| 4,119,893 | 10/1978 | Bayer et al. | 318/798 |
| 4,338,559 | 7/1982 | Blaschke et al. | 318/805 |
| 4,388,577 | 6/1983 | Blaschke et al. | 318/803 |
| 4,418,308 | 11/1983 | Bose | 318/803 |

OTHER PUBLICATIONS

Venkatarman et al., "Electronic Analog Slip Calculator for Induction Motor Drives", IEEE Transactions on Industrial Electronics and Control Instrumentation, vol. IECI-27, No. 2, 5-80, pp. 110-116.

Primary Examiner—David Smith, Jr.
Attorney, Agent, or Firm—C. M. Lorin

[57] ABSTRACT

The procedure described is based on a computation of the rotor emf of the asynchronous motor and hence of the slip or of a slip-proportional current component as obtained solely from measurements at the terminals. The instantaneous values of the required stator voltage or of the required stator current are formed with the computed signals either via a data-supported regulating circuit or by direct orientation on the space vector of the rotor emf, and fed with the aid of a fast electric controller to the motor.

Using the described procedure, it is possible, among other things, to obtain torque or rotational speed control with good dynamic behavior. The procedure has the advantage of requiring low parameter sensitivity and the capability of dispensing with sensors on the motor.

33 Claims, 9 Drawing Figures

VECTOR CONTROL SYSTEM FOR AC MOTOR DRIVES

BACKGROUND OF THE INVENTION

The invention's objective is a process for regulating an asynchronous motor which is energized by fast-acting control or correction elements such as, for example, voltage-impressing pulsed dc/ac converters (or inverters), transistorized dc/ac inverters, current-impressing dc-link inverters, etc. The state of development in this field is described, for example, in:

1. Jotten, R. State of the art for regulated 3-phase drive systems. VDE-Fachberichte, 30, VDE Verlag, Berlin, 1979.
2. Jotten, R. Dynamic behavior of asynchronized motors energized by converters. ETG-Fachtagung, ETG-Fachberichte, No. 5, Oct., 1979.
3. Abbondanti, A. and Brennen, M. Variable speed induction motors use electronic slip calculator based on motor voltages and currents. IEEE-Transactions, vol. IA-11, Sept.-Oct. 1975, No. 5.
4. Venkataram, R. Ramaswami, B and Holtz, J. Electronic analog slip calculator for induction motor drives. IEEE Transactions. Industry Electronics and control instruments. Vol. IEC 1=27, 1980.

Further, the invention is concerned with the rotational speed or torque regulation of asynchronous motors, chiefly those with squirrel cage rotors.

The state of the art reveals two lines of development. The dynamic behavior of the motors is today so well investigated that it is possible, with the inverters now available, to construct control and regulating devices which are equivalent or even superior in their dynamic behavior to rectifier energized dc motors. These arrangements require either a measurement of the rotor's position, in which case an additional automatic matching of the regulator to the rotor resistance, which varies with temperature, is required, or a measurement of the field is necessary. Further, the regulation must be carried out mainly as a regulation of the rotational speed, in which case, it is necessary to employ a tachometer motor. The supplementary accessories consisting of tachometers, rotor-position sensors and also, if need be, devices for carrying out a direct measurement of the field, are very undesirable complications, but they are, however, unavoidable if it is desired to effect control over a large rotational speed range, including crawling rotational speeds, with good dynamics. When, instead of field-measuring, use is made of field simulation, problems arise due to the required integration of measured variables without feedback. In addition, the range encompassing the crawling rotational speeds must be excluded. Also troublesome is that initial conditions are necessary in carrying out an integration.

Of course, the majority of applications require the adjustability of the rotational speed, and the requirements with regard to the dynamic behavior, that is control rate, and with respect to the static accuracy and load-independence of the adjusted speed, are comparatively small. Regulating devices for the stator frequency as a main control variable, or the rotational speed as a main control variable, are known for these cases. The regulation is mainly effected with current-fed inverters. Moreover, the dc-link current, used as a substitute for the value of the stator current, is regulated in a secondary circuit. In the case of speed control, the stator frequency is formed as the sum of the frequency of rotor rotation and a limited slip frequency which is specified by the rotational-speed regulating device, and the slip frequency is allocated to the value of the reference current via a characteristic curve former. In a known setup with no tachometer, there is added to the current controller a superimposed voltage regulating circuit whose actual value forms the rectified motor voltage. The required value of the voltage and the input data for the stator frequency are allotted to each other in accordance with a fixed characteristic curve. In the main, there is no slip limitation with this special arrangement. Overshooting the breakdown (stalling) slip is prevented by limiting the rate of change. The two-last-named processes and arrangements are mentioned as an example for the group of applications in which, with regard to the simplicity of the signal processing and low expenditure for sensors, allowance must be made for rise times of the order of 500 ms and poor damping of the transient effects.

SUMMARY OF THE INVENTION

The object of the present invention is to fill up the gap existing between complex systems which require expensive sensors in order to obtain good dynamic behavior and those using low cost sensors, but having a poor dynamic behavior. The object is, thus, to obtain a control system which requires only to measure the current and the voltage and, at the same time, which provides a satisfactory dynamic behavior, a sufficient static accuracy in the regulation and a wide range of rotational speed control. Along with control of speed, it should also be possible to control the torque as required, for example, in spooling drive systems. Thus, the invention relates to process and apparatus for controlling an asynchronous motor energized by fast-acting control circuits such as, for example, thyristorized or transistorized inverters, use being made essentially of the terminal currents and terminal voltages as the measured quantities e.g. process variables, for control.

All various embodiments described hereinafter have in common that two signals, hereinafter designated as the rotor emf components $e_{2\alpha}$ and $e_{2\beta}$ are derived from two terminal currents ($i_{1a}$ and $i_{1b}$) and two terminal voltages within a calculator circuit using as a basis the following equations:

$$e_{2\alpha} = L_2/M \cdot [u_{1\alpha} - R_1 i_{1\alpha} - [1/K_{11}] \cdot di_{1\alpha}/dt] \quad (1)$$

$$e_{2\beta} = L_2/M \cdot [u_{1\beta} - R_1 i_{1\beta} - [1/K_{11}] \cdot di_{1\beta}/dt] \quad (2)$$

where $e_{2\alpha}$ and $e_{2\beta}$ represent the rotational emf induced in the rotor winding in stator fixed orthogonal ($\alpha$, $\beta$)-coordinates.

From the rotor emf components, the measured stator currents and the stator frequency $\omega_1$, a computed value $\omega_{2c}$ is derived from a calculator as the instantaneous value of the slip frequency computed in accordance with the equation $$\omega_{2c} = R_2 \cdot \frac{M}{L_2} \cdot \frac{e_{2\alpha} \cdot i_{1\alpha} + e_{2\beta} \cdot i_{1\beta}}{e_{2\alpha}^2 + e_{2\beta}^2} \cdot \omega_1 \quad (3)$$

DESCRIPTION OF THE PREFERRED EMBODIMENTS

All the various embodiments described hereinafter have in common that two signals, hereinafter designated as the rotor emf components $e_{2\alpha}$ and $e_{2\beta}$, are derived from two terminal currents ($i_{1a}$ and $i_{1b}$) and two terminal voltages (phase b and phase c) within a calculator circuit (1) shown in FIG. 1, using as a basis the following equations:

$$e_{2\alpha} = L_2/M \cdot [u_{1\alpha} - R_1 i_{1\alpha} - [1/K_{11}] \cdot di_{1\alpha}/dt] \quad (1)$$

$$e_{2\beta} = L_2/M \cdot [u_{1\beta} - R_1 i_{1\beta} - [1/K_{11}] \cdot di_{1\beta}/dt] \quad (2)$$

where $e_{2\alpha}$ and $e_{2\beta}$ represent the rotational emf induced in the rotor winding in stator fixed orthogonal $(\alpha,\beta)$-coordinates.

Hereinafter, quantities with the indices $(\alpha,\beta)$, such as, $i_{1\alpha}$ and $i_{1\beta}$, are referred to as orthogonal stator fixed coordinates. The pair of components represents vectors in space. Vectors are also symbolically represented as underlined quantities.

Figure 1:
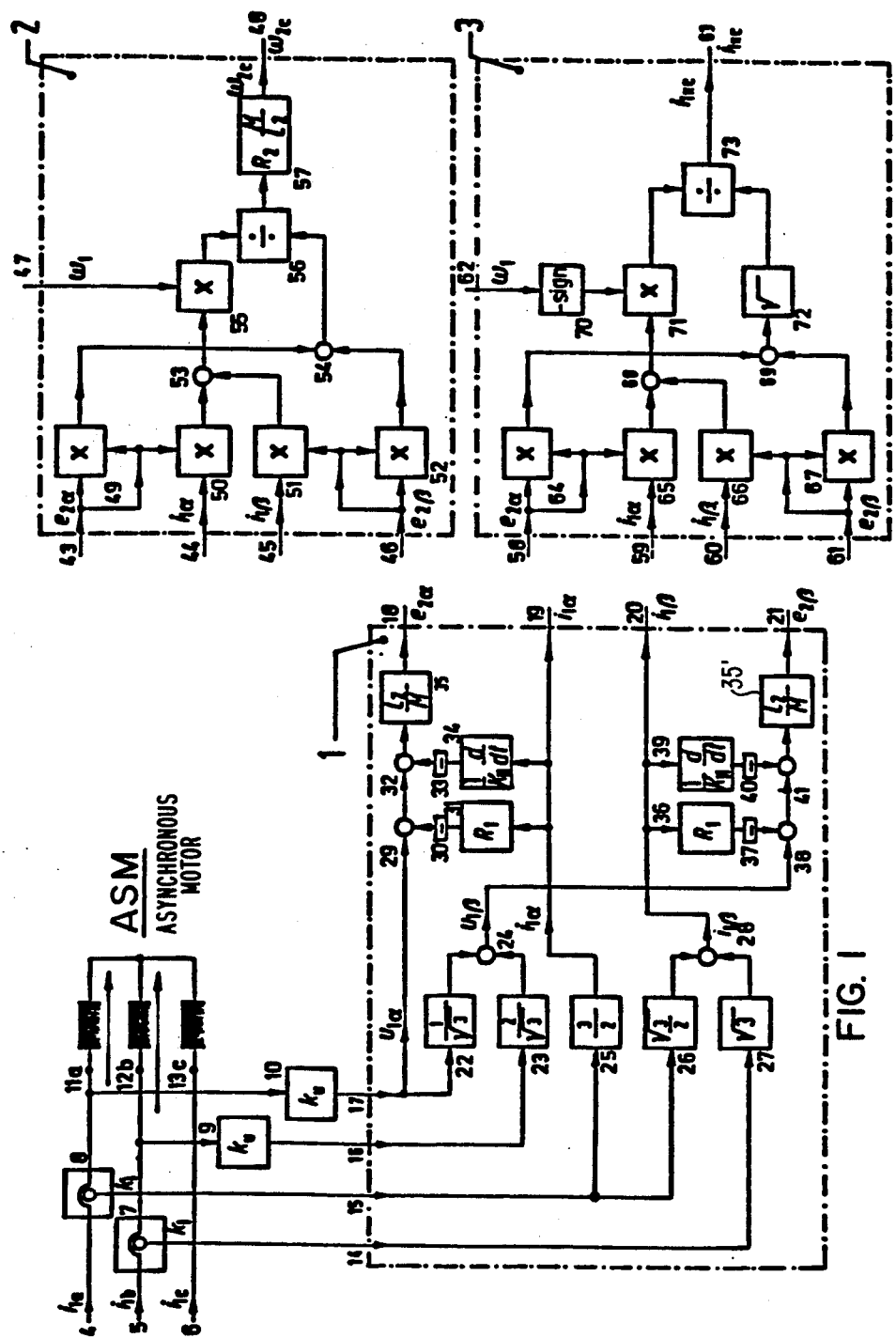
FIG. 1 shows in block diagram the derivation of the asynchronous motor rotor emf components $e_{2\alpha}$ and $e_{2\beta}$ from terminal current and voltages.

From the rotor emf components, the measured stator currents and the stator frequency $\omega_1$, a computed value $\omega_{2c}$ is derived from calculator (2) of FIG. 1 as the instantaneous value of the slip frequency computed in accordance with the equation $$\omega_{2c} = R_2 \cdot \frac{M}{L_2} \cdot \frac{e_{2\alpha} \cdot i_{1\alpha} + e_{2\beta} \cdot i_{1\beta}}{e_{2\alpha}^2 + e_{2\beta}^2} \cdot \omega_1 \quad (3)$$

Calculator (2) will be designated hereinafter where the elements of the computation are derived as shown in FIG. 1 as the slip calculator.

According to one embodiment of the invention, instead of proceeding with the determination of slip frequency, it is determined by computation what is the value of $i_{1xc}$ which is a stator current component proportional to the slip frequency (designated hereinafter as the $i_{1x}$ component), the value of $i_{1xc}$ being obtained from the following equation:

$$i_{1xc} = \frac{e_{2\alpha} \cdot i_{1\alpha} + e_{2\beta} \cdot i_{1\beta}}{\sqrt{e_{2\alpha}^2 + e_{2\beta}^2}} \cdot \text{signum } \omega_1 \quad (4)$$

The computation is performed by calculator (3) in FIG. 1. Circuit (3) will be designated as the $i_{1x}$-calculator.

The subscripts (x,y) always denote components in a reference system which will be defined below. Further, quantities characterized by an asterisk are input data or required values. The instantaneous value of the motor's interior torque is proportional to the product obtained by multiplying the value of the rotor's interlinking flux by $i_{1x}$, so that $i_{1x}$ can also be designated as a torque-forming stator current component.

The parameters represented in the above four equations by upper case letters are: stator resistance $r_1$, stator inductance $L_1$, main inductance M. $L_2$ denotes the rotor inductance referred to the stator side and $K_{11} = L_2/(L_1 L_2 - M^2)$ as is usual in the two-axis theory of the motor. As well known the impedance parameters amount to $\frac{2}{3}$ of the phase values.

Referring again to FIG. 1, two current transformers (7, 8) and two voltage transformers (9, 10) form the potential-free measurement data for the stator voltages and currents. The differentiations in (1) FIG. 1 (34, 39) can be formed via pure differentiating circuits, but also via differentiating circuits with subsequent delay of the first order. Multiplication with signum $\omega_1$ (71) in FIG. 1 can also be effected in known manner without a multiplier unit using an operational amplifier in conjunction with an analog circuit and a comparator.

The measuring and computing circuit shown in FIG. 1 and its still-to-be-described usage are new and bring a number of appreciable advantages.

As distinct from all hitherto known remotely similar conceptions, the components of the rotor emf are determined in a stator-fixed orthogonal reference system from terminal currents and terminal voltages. The necessary computational operations, scaling, adding, subtracting, multiplying and dividing can all be easily effected with commercially common analog computers, likewise the double differentiation. A further surprising advantage resides in the fact that the values for the rotor emf, although containing the first derivative of the stator current components as a constituent, are quantities with very low harmonics content. Whereas, in general, a smoothing is expected from an integration and, on the other hand, an increase is expected in the harmonics fraction as the result of a differentiation, here the reverse is actually the case based on the structure of the motor.

By contrast to the hitherto preferentially employed orientation on the motor field or on the rotor position, an orientation can now be effected on the rotor emf. In so doing, use is made, in accordance with the invention, of the fact that, with an approximately quantitatively constant rotor flux vector, the space vector of the rotor emf is rotated by $+\pi/2$ or $-\pi/2$ with respect to the rotor interlinking flux vector $(\psi_2)$ and that $|e_2| = |\omega_1| |\psi_2|$ applies for the amounts.

The rotor flux vector always lies in the y direction, while the rotor emf vector lies in the $\pm x$ direction of the (x,y) coordinate system. The described computer arrangement shown in FIG. 1 can only be employed with the use of a voltage-impressing inverter or with the use of a current impressing inverter in a different way. It is used in such a sense for the input data for the instantaneous values of the stator voltage vector via its components ($u^*_{1x}$, $u^*_{1y}$) or for the input data of the stator current vector via its components ($i^*_{1x}$, $i^*_{1y}$), and further, in both cases, for the slip data and slip-limitation or for the input data and limiting of the slip-forming stator current component, that the value of the rotor interlinking flux remains constant in the region of the primary rotational speed.

As a result, transient electromagnetic effects in the motor are prevented, the torque can be changed quickly and the values calculated in accordance with equations (3) and (4) agree very closely with the true values of the slip and of the current components proportional to the slip.

Previously proposed arrangements to evaluate the slip frequency from the stator quantities (3) are based on the stationary equations of the motor and make use of coarse approximations, the consequence of which is that the static accuracy is inadequate and, with rapid changes, dynamically correct reproduction is not ensured. In addition, in order to determine the slip frequency of the coarser approximations employed, direct use is made of the stator voltages, which have a higher harmonics content. In addition, use is made of integrators which bring problems associated with drift and the initial conditions.

Figure 2:
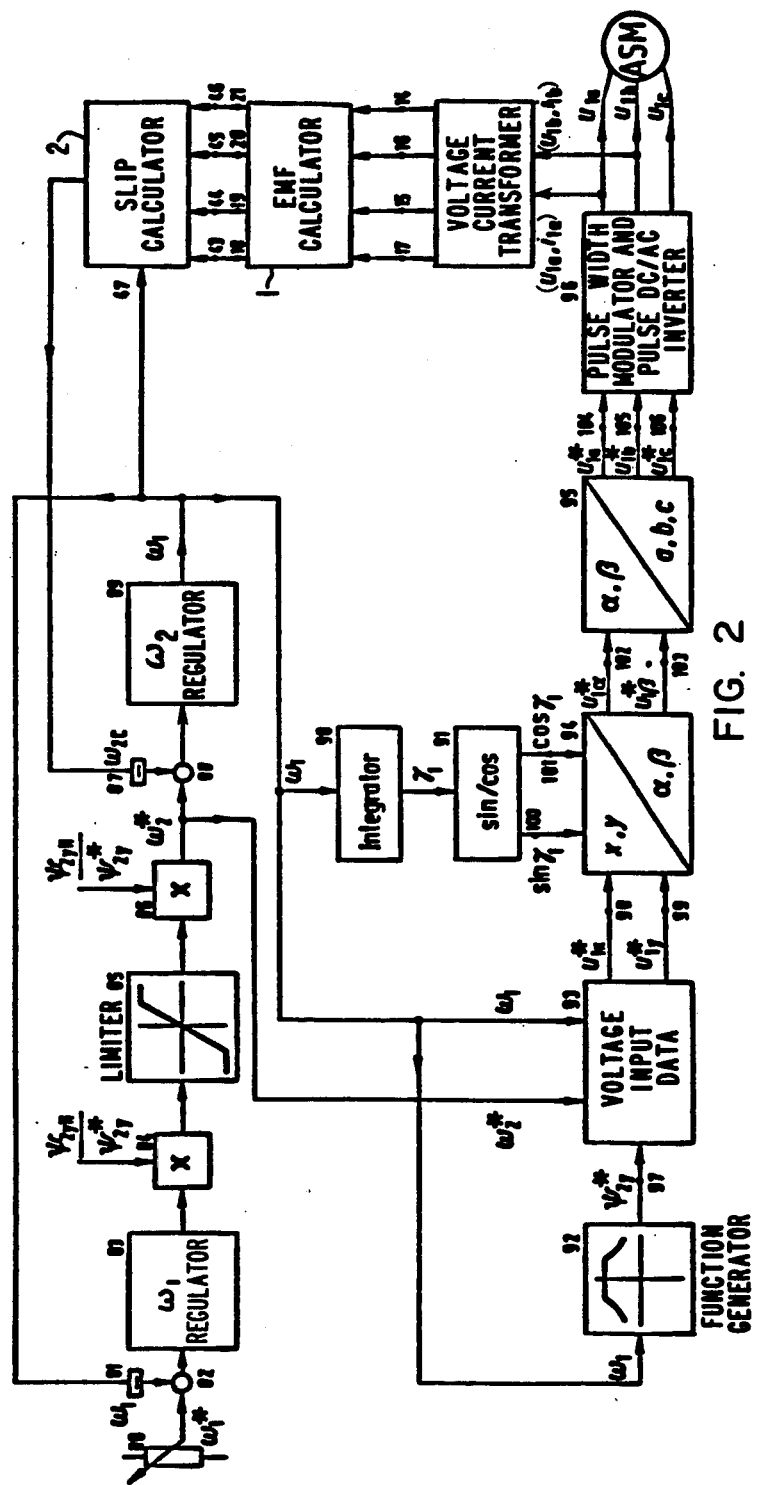
FIG. 2 shows in block diagram an adaptation of the circuit of FIG. 1 within a voltage-fed inverter control system.

According to the present invention, a voltage-fed inverter and a voltage source can be used as shown in FIG. 2.

A secondary slip control loop is provided which receives the reference slip value $\omega^*_2$ from a superimposed regulator such as, for example, a rotational speed regulating device, a torque input value or, as shown in FIG. 2 from a stator frequency regulator (80 to 86).

The output value of the slip frequency calculator is the actual value fed to the $\omega_2$ regulator (89). The stator frequency is outputted from block (89). The stator frequency, the required value of the rotor frequency and the input value for the value of the rotor interlinking flux are used to build the required voltage components ($u^*_{1x}$, $u^*_{1y}$) in the direction of the rotor interlinking flux and at right angles to it (93).

The spatial argument angle $\gamma_1$ for the stator angle is formed from $\omega_1$, defined in known manner from $\gamma_1 = \omega_1$, and, from the calculation of the sin-cos values (91), the required values for the 3 phase windings voltages are formed in known manner via 2 coordinate transformations (94 and 95).

The slip-frequency limitation is arrived at by providing a limiter (85) in known manner for the required value of the slip. The internal slip-regulating circuit was not possible until now, because it was lacking an accurate, dynamically correct measuring possibility. In FIG. 2, PWM=pulse width modulation process, PWR=pulse dc/ac inverter.

Figure 3:
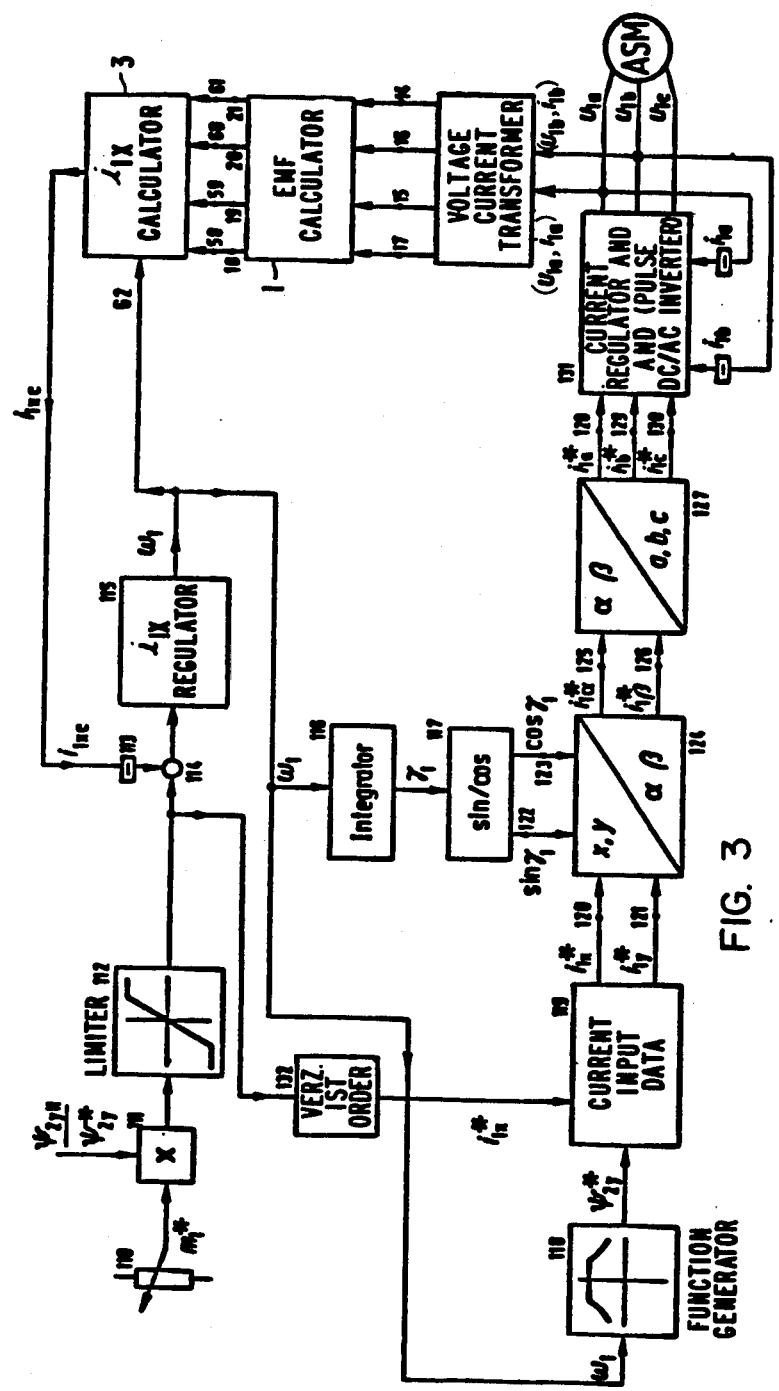
FIG. 3 shows in block diagram an adaptation of the circuit of FIG. 1 within a current-fed inverter control system.

With input data of the stator current via a two-point regulator process or subordinated current regulation and stator voltages as regulated quantities (controller outputs), the setup shown in FIG. 1 can be used in modified form as illustrated in FIG. 3.

According to FIG. 3, a subordinated regulating circuit is provided for the stator current component $i_{1x}$, whereby the required value, shown as an example, is formed from a torque input data (110) or from a rotational speed regulating device or from a stator frequency regulator. According to FIG. 1, the output from the $i_{1x}$ calculator is the required value $i_{1xc}$ fed to the $i_{1x}$-regulator (115), the stator frequency is the output quantity.

The further refinement is very similar to that in FIG. 2. The required value of the current producing the torque and the input data for the value of the rotor interlinking flux are used to determine the input data for the current components $i^*_{1x}$ and $i^*_{1y}$ (119), whereby $i^*_{1x}$ is formed directly from the required value of the $i_{1x}$-regulator via a phase-shifting section (or lag element) of the first order whose time constant is dependent on the $i_{1x}$ regulating circuit. In this case, slip limitation is attained by limiting the required value of the current component producing the torque (112).

Instead of building a frequency $\omega_1$ and from it the angle $\gamma_1$, to carry out a coordinate transformation via a subordinate regulating circuit, with the calculated value for the slip frequency formed via the rotor emf components, or with the calculated value $i_{1xc}$ as a control variable, the angle $\gamma_1$ can be obtained directly from the rotor emf components.

For example, $\gamma_1$ can be computed directly from the arctan of the quotient $e_{2\beta}/e_{2\alpha}$ or from arccos $e_{2\alpha}|e_2|$ and from signum $e_{2\alpha}$, signum $e_{2\beta}$ and signum $\omega_1$. Taking the sign of $e_{2\alpha}$, $e_{2\beta}$ and $\omega_1$ into account leads to a definition of the value of $\gamma_1$ in the angular range 0 to $2\pi$.

Figure 4:
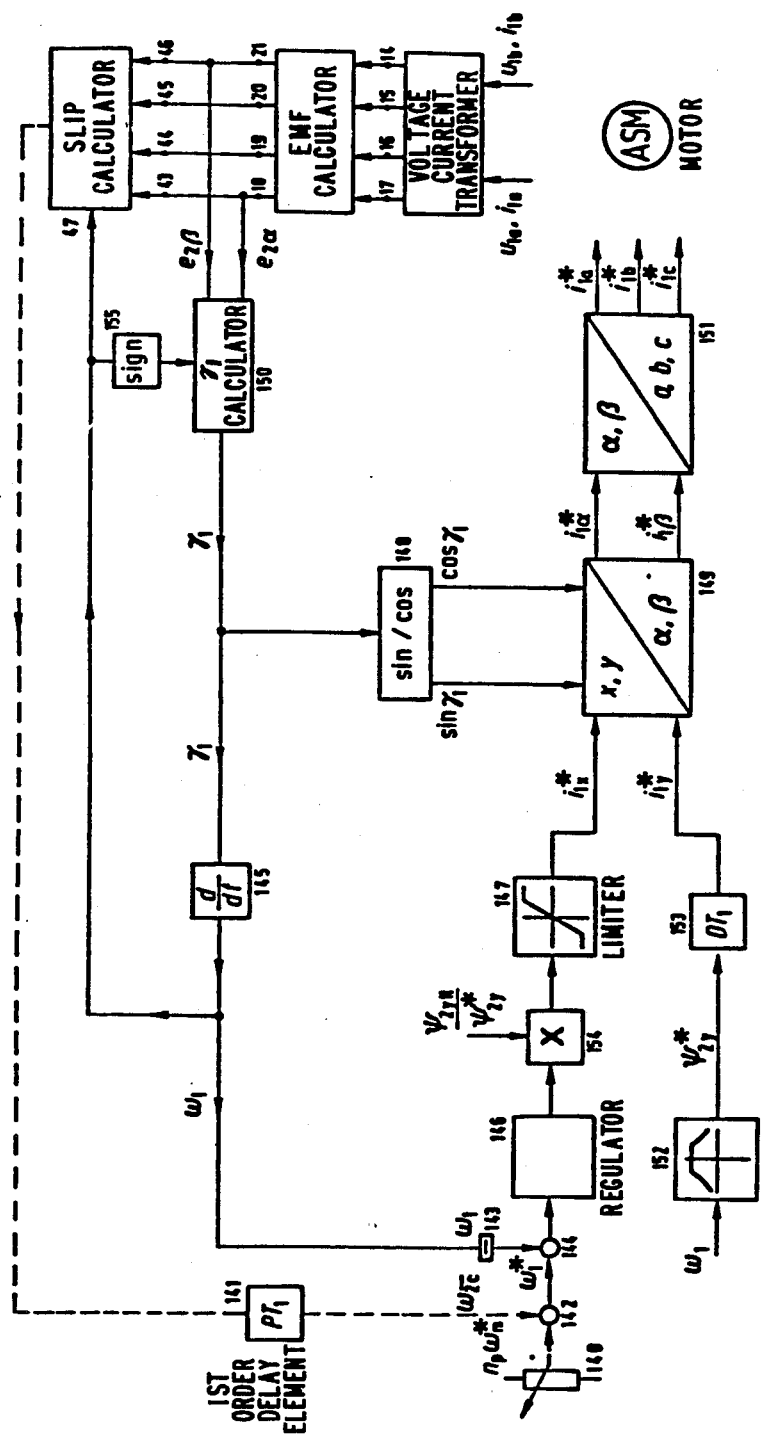
FIG. 4 shows a modification of FIG. 1 in which the stator current (via a two-step controller) and the stator voltages are used as regulated variables.

FIG. 4 shows a signal processor which uses a determination of this type of the angle $\gamma_1$ from the rotor emf components. In their assignment to the asynchronous motor, the current components $i^*_{1x}$ and $i^*_{1y}$ are thereby spatially oriented directly to the rotor emf components.

The emf calculator shown in FIG. 1 yields the rotor emf components. The determination of the angle in the $\gamma_1$-calculator (150) is effected as described above. The determination of the current components $i^*_{1x}$ and $i^*_{1y}$ along with the two transformations, are already known from the preceding operating examples. The formation of the actual value of the stator frequency $\omega_1$ from the differentiation of the angle $\gamma_1$ (145) is masked out with the passage of the value of the angle $2\pi$ to 0 ( or 0 to $2\pi$ with $\omega_1<0$), and the last value $\omega_1$ is briefly retained.

Figure 5:
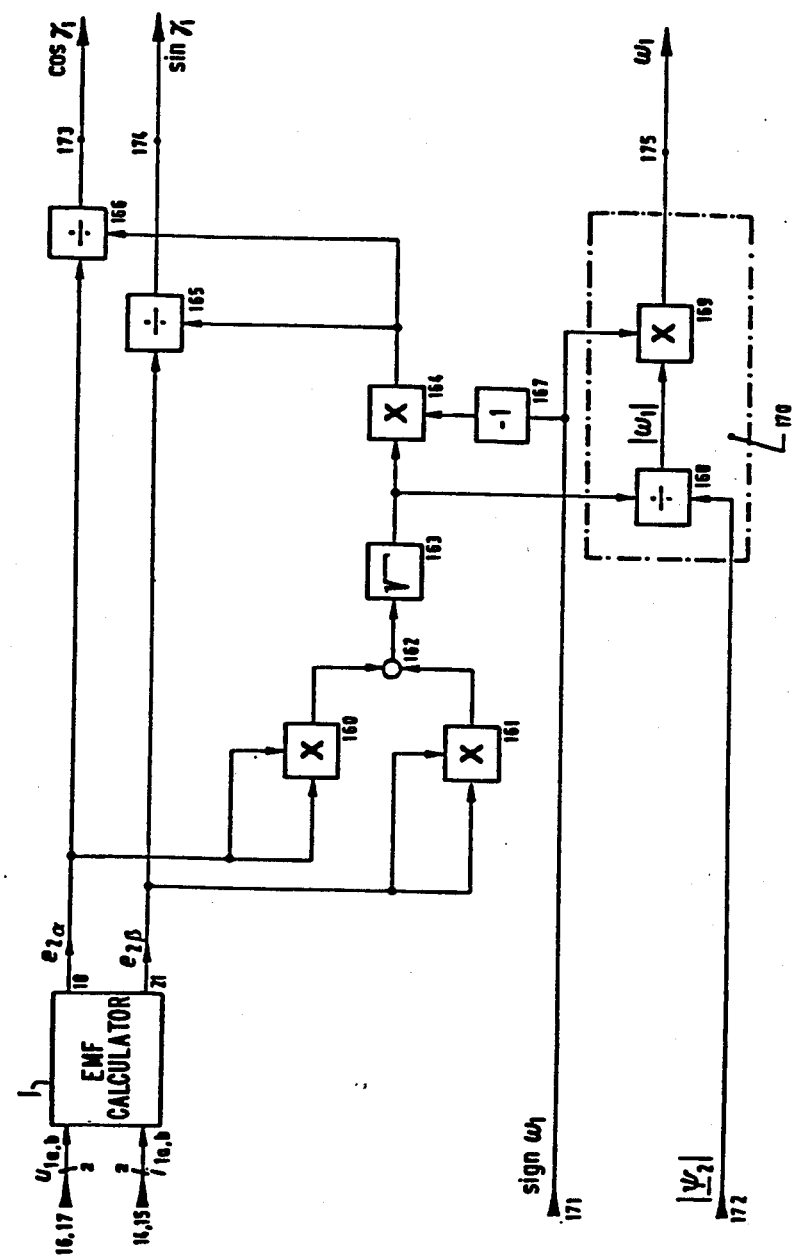
FIG. 5 shows the signal processor used for the determination of the angle $\gamma_1$ from the rotor emf components.

FIG. 5 illustrates a solution for the direct formation of the pair of values cos $\gamma_1$ and sin $\gamma_1$ from the components of the rotor emf. The value of the rotor emf vector is formed via the two multipliers (160, 161), the summation unit (162) and the unit for forming the square root (163). The division (165, 166) of the components of the rotor emf by the value directly yields the calculated values cos $\gamma_1$, sin $\gamma_1$.

The determination of the stator frequency to effect a stator frequency regulation can be carried out with the supplementary device enclosed in the broken lines in FIG. 5. When operating the asynchronous motor in both directions of rotation, the sign of the stator frequency (signum $\omega_1$) must be known in order to determine the pair of values sin $\gamma_1$ and cos $\gamma_1$ and the input data for the stator frequency. The sign of the stator frequency may easily be determined from the control procedure to be described below.

Figure 6:
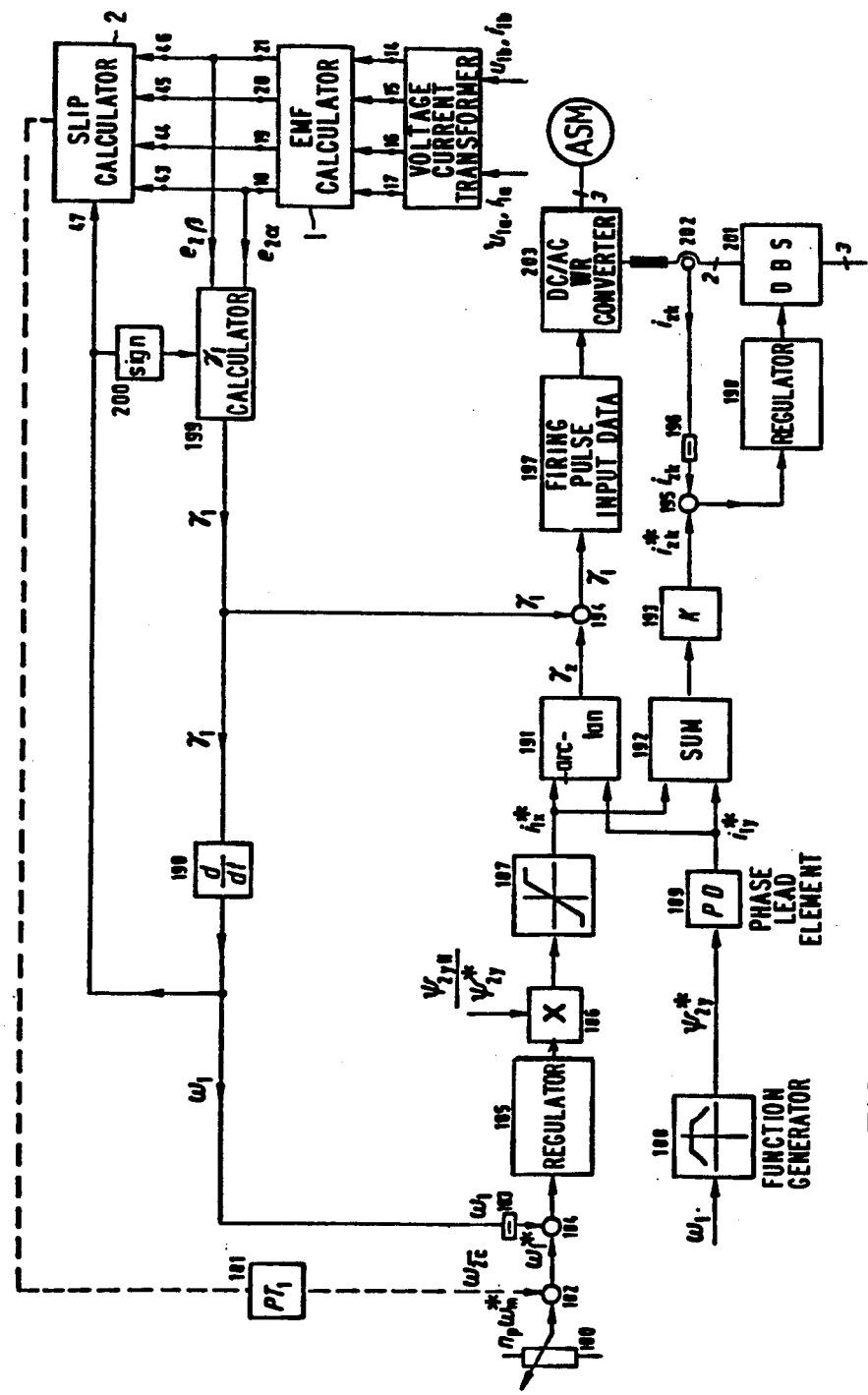
FIG. 6 shows the apparatus according to the invention with signal processing in a current-source inverter situation.

The current-fed inverter with smoothed dc-link current and phase-sequence quenching has established itself as a relatively economical and operationally reliable inverter and is frequently employed. Consequently, in the following, a description will be given of the use of the above-described procedure in association with this inverter. FIG. 6 shows a signal processor for an inverter with current-impression in a dc-link circuit using the components of the rotor emf supplied by the emf calculator, and using the direct spatial assignment of the phase current to the rotor emf vector. Other than with the data for the instantaneous value of the required value of the stator's phase current (FIG. 4), here the angle and the value are given separately. In so doing, the angle which determines the conductive state of the inverter (203) on the motor-side is formed from the angle $\gamma_1$ and a supplementary angle $\gamma_2$ which gives the rotation of the stator current reference ($i^*_{1z}$, $i^*_{1y}$) value vector with respect to the rotor emf vector.

The dc-link current is derived, on the other hand, in known manner from the magnetization current component and the torque-building current component which is given by the regulator belonging to the outer control circuit. PD (189) denotes a phase-lead element with a proportional part and a differentiating part. Apart from the commutating intervals, only two phase conductors of the motor carry the current and the stator current space vector consequently carries out an unsteady jerky rotational movement. The conduction state is set by the firing pulse input data. Because the angle $\gamma_1$, and consequently, on account of the calculation being independent of the initial conditions, the rotor emf components need only be known outside the commutation time, it is possible, with the aid of a coordinate transformation from polar into Cartesian coordinates, to determine the instantaneous value of the stator current, in accordance with the invention, from the intermediate dc current as a measure of the value of the stator current space vector, and from the conducting state of the dc/ac converter on the motor side, as a measure of the spatial argument angle.

After the conversion to rectangular coordinates, the current is fed as described above to the rotor emf and to the slip calculator. It is consequently possible to dispense with two current transformers and the transformation of the actual values of the current from the (a,b,c) into the ($\alpha,\beta$) system of coordinates.

Figure 7:
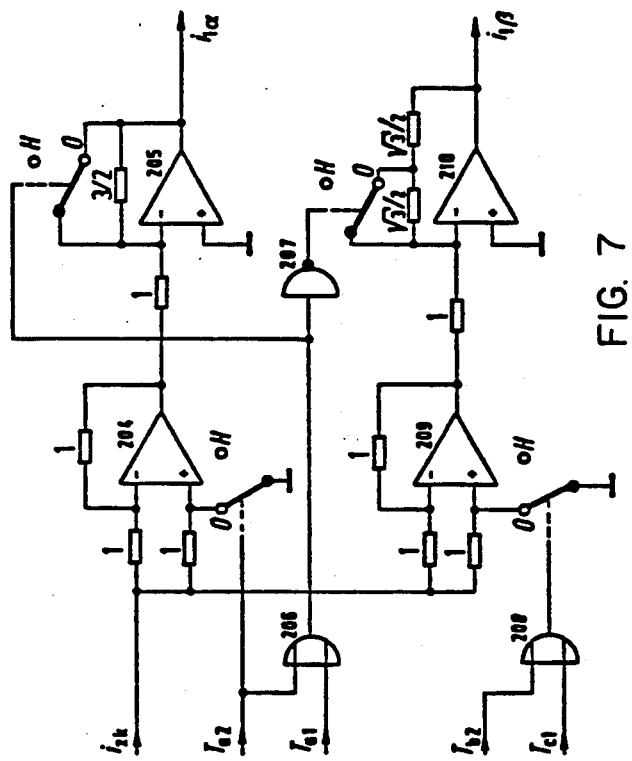
FIG. 7 illustrates the derivation of $i_{1\alpha}$ and $i_{1\beta}$ from the converter current and from the logic of the conduction states in the inverter.

FIG. 7 illustrates the derivation of a representation of the motor terminal currents from the dc-link current and the conducting state of the dc/ac converter on the motor side, in an arrangement with analog and digital components.

Here $i_{zk}$ is the dc-link current which is measured by means of a current transformer and which is used here both for regulating the rectifier on the power supply side and also the value signal for the stator current.

The logic signals T are determined from the conductive states of the motor-side controlled rectifiers and always have the logic "H" when the associated rectifier conducts. Thereby, the first index of the logic signal indicates the phase conductor with which the assigned rectifier diode is connected, the second index is equal to 1 for the controlled rectifier connected to the cathode side and equal to 2 for the controlled rectifier connected to the anode side of the power supply side-converter 201.

Regulation of the asynchronous motor can be effected with torque input data as, for example, with the arrangement shown by way of example in FIG. 3 or with superimposed regulation of the stator frequency as, for example, in FIG. 2, or with increased requirements with respect to the independence of the rotational speed on the load torque by using a rotational speed controller. In this connection, in accordance with FIG. 4 and FIG. 6, there is specified a required value $(n_p \cdot \omega_m)^*$ which is proportional to the desired rotational speed. To this signal is added the computed value of the slip, the addition being made via a first order delay element (141, 181).

The value of the sum is fed as a required value to the stator frequency regulating circuit. The further developed form of the regulator is as described in the preceding examples.

Regulation of the rotational speed is also possible by using a tachometer.

In the fractions in equations (3) and (4), the numerators and the denominators approach the value zero when the motor tends to its state of rest. As a result, the procedure so far described breaks down in a critical region close to zero frequency, the breakdown being greater the greater the error in the motor parameters set in the regulator. In accordance with the invention, measures are provided to narrow down this critical region. This is effected by shifting the scaling factors in known manner in the calculator circuits.

In accordance with the invention, additional measures are provided to make possible a different way of operating in the critical region, namely to frequency control the processes of starting, braking, stopping and reversing. These measures, which are in accordance with the invention, will be described in the following.

Figure 8:
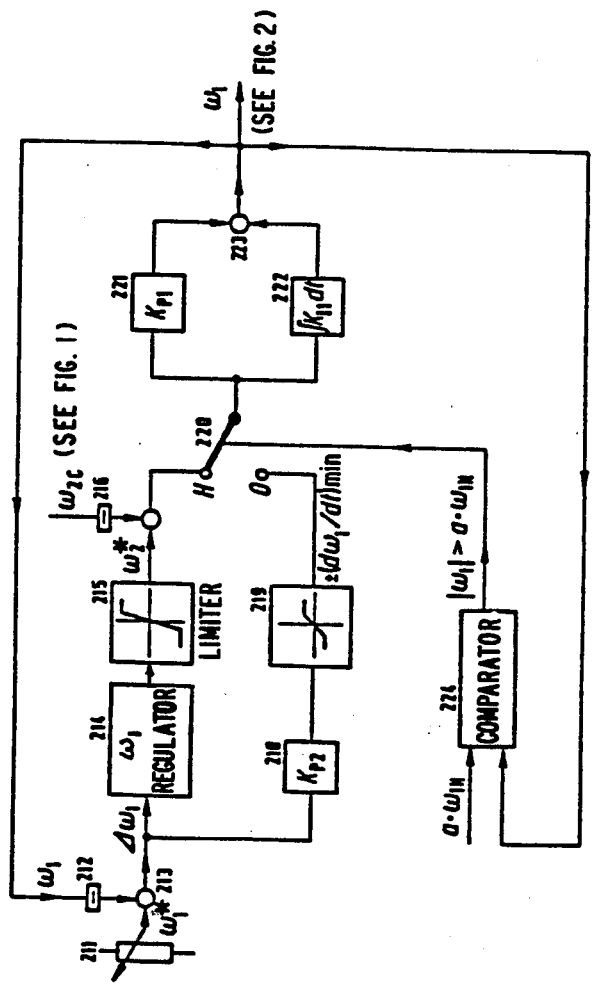
FIG. 8 shows another embodiment of the invention which allows passing the dead zone near zero speed, thereby leading to starting, braking to a stop and reversing within the range of control.

FIG. 8 shows a supplementary apparatus which makes possible a frequency-controlled passage through a zone close to the zero-passage of the stator frequency. In the process, illustrated here by way of example by an $\omega_1$-regulator with a subordinated slip control circuit, the slip regulator is masked out on undershooting a frequency value $a\omega_{1N}$, in that a switch-over takes place to the lower path (218, 219). A limited value $(d\omega_1/dt)_{min}$ is fed via a high amplification proportional element (218) and the following limiting stage (219) to the integrator of a slip-regulator which, in FIG. 8, takes the form of a PI-regulator, the sign of $(d\omega_1/dt)_{min}$ being the same as that of the deviation $\Delta\omega_1$ and which vanishes at $\Delta\omega_1=0$.

With the supplementary apparatus, starting and braking to a stop, reversing and continuous running is possible in the control range. Transient effects which arise in the control range, and which, together with the reduction of the internal torque, which takes place with accelerating or braking processes within the control range, are troublesome and can be circumvented with an enlarged supplementary apparatus for passage through the control range in a quasi-regulated manner.

Figure 9:
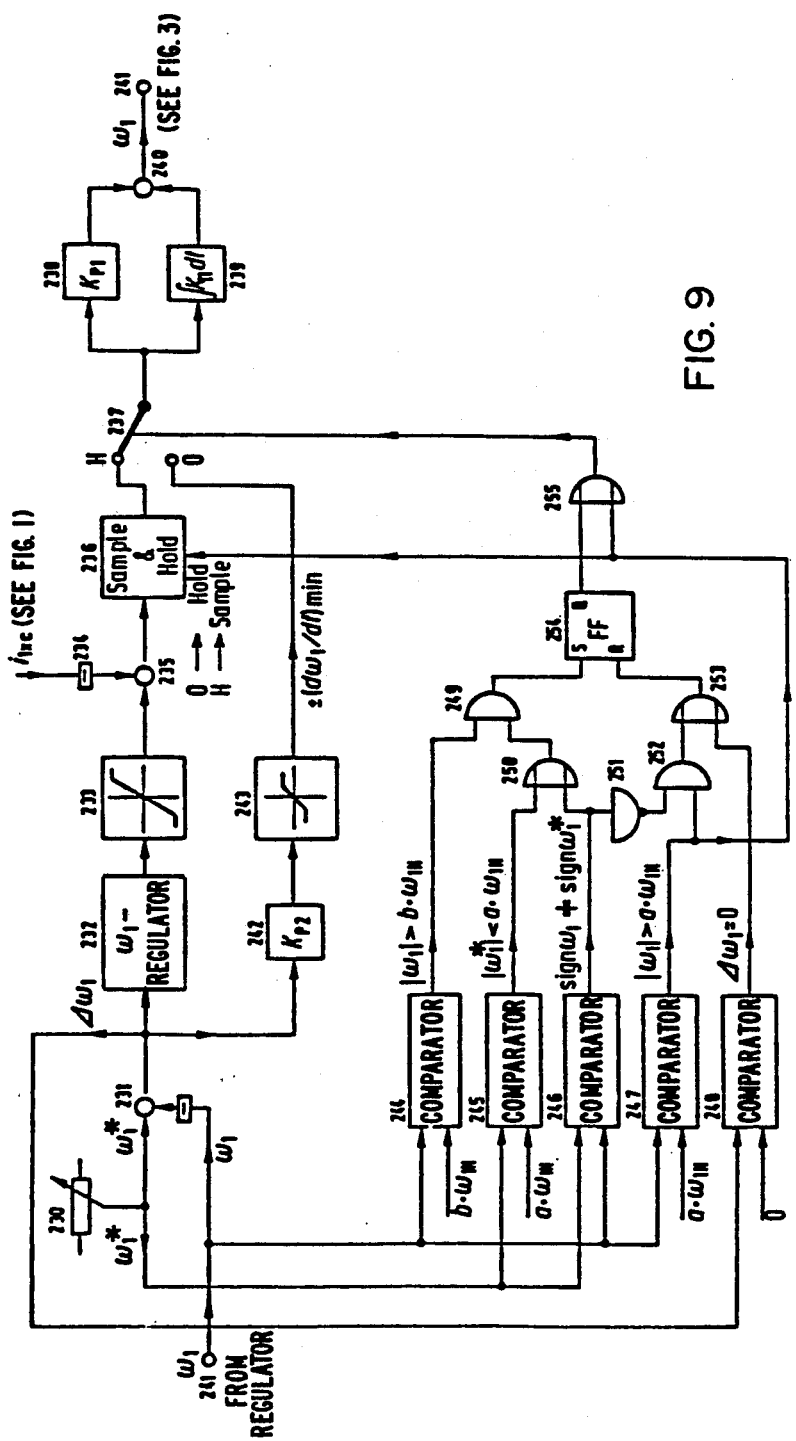
FIG. 9 shows the $i_{1x}$ regulator in an embodiment allowing sufficient time after a jump in the reference value until regulation has reached the steady state.

FIG. 9 shows an $i_{1x}$ regulator and PI-behavior is assumed for the regulator of the subordinate circuit.

In addition to the condition $\omega_1 < a\omega_{1N}$, that is, operation within the control range, there now enters a second condition denoted by b, with $b>a$, which ensures that the quantity $d\omega_1/dt$, which can be evaluated from the slip regulator or the $i_{1x}$-regulator, or from the direct orientation on the rotor emf vector, and which can be held constant on entering into the control region and/or on traversing the control range, is determined from a steady state, and which ensures that sufficient time has elasped after a jump in the required value until entry into the control range so that, for example, the regulation for the subordinate circuit has reached, up to that time, the steady state.

By observing the above-required conditions, the logic shown in FIG. 9, which operates via the flip-flop (254) and via a holding and scanning element (236), holds the input of the PI-regulator (238, 239) constant at the value immediately prior to entry into the control range, until either the condition $\Delta\omega_1$ is fulfilled or until the control range has again been left.

On the other hand, on starting-up from the state of rest or with a change in the required value of the external control circuit after continuous operation in the control range, $(d\omega_1/dt)$ is preset via the path with the proportional amplifier (242) and the limiter (243).

When using the enlarged supplementary device, reversing which begins in the regulation range, or braking processes out of the regulation range into the control range, take place with constant internal torque and with almost no transient effects in the field.

In addition, on starting from the state of rest, the required value $\omega^*_2$ of the slip frequency becomes such that the stator frequency is greater than the frequency limit $a\cdot\omega_{IN}$ of the control range and that, as a result, the control range can be immediately left on starting. As a result of this, regulated operation of the asynchronous motor can be achieved in almost all operating cases which can occur without it being necessary to have an accurate knowledge of the motor's parameters.

Obviously, the supplementary device shown in FIG. 8 and the enlarged supplementary device shown in FIG. 9 can be transferred to all the procedures presented in claims 2 to 9 and 12 to 14, and bring the following advantage:

By using the control range, there is now no longer any need for an accurate knowledge of the parameters $R_1$, $R_2$, $L_{S1}$, $L_{S2}$ and $M$, which would otherwise be necessary at low rotor frequencies. As a result, the advantage of using a control process which does not require the knowledge of these parameters, which otherwise would be limited to high stator frequencies is extended to the entire rotational speed range. On the other hand, use is made of the benefit that the switch from control to regulation proceeds out of the control range directly and without a required knowledge of initial conditions.

The regulating processes illustrated in the description can be extended without large additional expenditures to the field-weakening region. In the process, as shown, for example, in FIGS. 2 and 3, $u^*_{1x}$, $u^*_{1y}$, or $i^*_{1x}$ $i^*_{1y}$ must be incorporated both in the input data and in the superimposed regulating circuit.

In FIG. 2, the required value of the slip is multiplied in two places, before and after the limiting element (85), by the reciprocal of the field-weakening ratio. On the other hand, on forming the required value signal or the input value $i^*_{1x}$ in accordance with FIGS. 3, 4 or 6, only one multiplication is carried out, namely before the limiting stage (112, 147, 187). The input value for the rotor interlinking flux is modified in a frequency-dependent manner via the characteristic curve diagrams, such as (92) in FIG. 2 or (118) in FIG. 3, and serves as an input quantity for forming the u-input value (93) or the i-input value (119).

The change in the rotor flux input data value in the field-weakening region has a negligibly small effect on the required condition $d|\psi_2|/dt\approx 0$, which is the prerequisite for the $\omega_{2c}$ and $i_{1xc}$ calculation, as well as for the orientation with respect to the rotor emf components.

The procedure described is based on a computation of the rotor emf of the asynchronous motor and hence of the slip or of a slip-proportional current component as obtained solely from measurements at the terminals. Th instantaneous values of the required stator voltage or of the required stator current are formed with the computed signals either via a data-supported regulating circuit or by direct orientation on the space vector of the rotor emf, and fed with the aid of a fast electric controller to the motor.

Using the described procedure, it is possible, among other things, to obtain torque or rotational speed control with good dynamic behavior. The procedure has the advantage of requiring low parameter sensitivity and the capability of dispensing with sensors on the motor.

We claim:

1. A system for controlling an induction motor, having a rotor winding and a stator winding, driven by a polyphase power supply of variable frequency and variable voltage through motor line terminals, comprising:
   means for sensing two motor input currents from said line terminals;
   means for sensing two of the motor terminal voltages;
   means responsive to said two input currents and two terminal voltages for deriving, by reference to stator coordinates ($\alpha$, $\beta$), vector representative signals $i_{1\alpha}$, $i_{1\beta}$, $u_{1\alpha}$ and $u_{1\beta}$, where $i_{1\alpha}$ and $i_{1\beta}$ are orthogonal components of the input currents, where $u_{1\alpha}$ and $u_{1\beta}$ are orthogonal components of the terminal voltages;
   vector calculator means for computing the orthogonal components $e_{2\alpha}$, $e_{2\beta}$ of the rotational EMF induced in the rotor winding of the motor by reference to said stator coordinates ($\alpha$, $\beta$) in accordance with the formuls:

$$e_{2\alpha}=L_2/M\cdot\{u_{1\alpha}-R_1 i_{1\alpha}-[1/K_{11}]\cdot di_{1\alpha}/dt\}$$

$$e_{2\beta}=L_2/M\cdot\{u_{1\beta}-R_1 i_{1\beta}-[1/K_{11}]\cdot di_{1\beta}/dt\}$$

where $R_1$ is the stator resistance; $L_2$ is the rotor inductance; $M$ is the mutual inductance; where $K_{11}=L_2/(L_1L_2-M^2)$ and $L_1$ is the stator inductance; where $\alpha$ and $\beta$ are the orthogonal axes of a stator-related coordinate reference system;
thereby providing a spatial representation of the vector characterizing said induced rotor EMF; and
means responsive to said induced rotor EMF for controlling at least one of the motor electrical input variables.

2. The system of claim 1 with said controlling means being directly responsive to said induced rotor EMF.

3. The system of claim 1 with means responsive to said induced rotor EMF for providing a representation of the rotor flux linkage of the motor, with said controlling means being responsive to said rotor flux linkage representation.

4. The system of claim 1 with means for providing a signal representative of the stator frequency $\omega_1$; and with slip calculator means operative with ($e_{2\alpha}$, $e_{2\beta}$) and $\omega_1$ for generating a signal $\omega_{2c}$ as a representation of the slip frequency between rotor flux linkage and rotor winding in accordance with the formula:

$$\omega_{2c} = R_2 \cdot \frac{M}{L_2} \cdot \frac{e_{2\alpha}\cdot i_{1\alpha} + e_{2\beta}\cdot i_{1\beta}}{e_{2\alpha}^2 + e_{2\beta}^2} \cdot \omega_1$$

where $R_2$ is the rotor resistance.

5. The system of claim 1 with means for providing a signal representative of the stator frequency $\omega_1$; and with stator current component calculator means for computing a component of the stator current $i_{1xc}$ which is proportional to the slip frequency $\omega_2$, in accordance with the formula:

$$i_{1xc} = \frac{e_{2\alpha} \cdot i_{1\alpha} + e_{2\beta} \cdot i_{1\beta}}{\sqrt{e^2_{1\alpha} + e^2_{2\beta}}} \cdot (\text{sign of } \omega_1)$$

where xc is a coordinate of an (x, y) orthogonal reference system, the abscissa of which are aligned in the direction of the induced rotor EMF, the y ordinate of which is aligned in the rotor flux direction.

6. The system of claim 1 with a first differentiator responsive to $i_{1\alpha}$ for deriving a first signal representative of $[1/K_{11}] \cdot di_{1\alpha}/dt$; with a first scaler responsive to $i_{1\alpha}$ for deriving a second signal representative of $R_1 i_{1\alpha}$; said signal $u_{1\alpha}$, and said first and second signals being algebraically summed and inputted into a second scaler of value $L_2/M$, thereby to derive said signal representative of $e_{2\alpha}$.

7. The system of claim 6 with a second differentiator responsive to $i_{1\beta}$ for deriving a third signal representative of $[1/K_{11}] \cdot di_{1\beta}/dt$; with a third scaler responsive to $i_{1\beta}$ for deriving a fourth signal representative of $R_1 i_{1\beta}$; said signal $u_{1\beta}$, and said third and fourth signals being algebraically summed and inputted into a fourth scaler of value $L_2/M$, thereby to derive said signal representative of $e_{2\beta}$.

8. The system of claim 7 with said motor being responsive to a voltage source inverter controlled in accordance with two orthogonal voltage reference signals $u^*_{1\alpha}$ and $u^*_{1\beta}$ derived from direct and quadrature reference voltages $u^*_{1x}$ and $u^*_{1y}$ aligned with said (x, y) coordinates, controlled in relation to the stator frequency $\omega_1$ and in accordance with the spatial argument angle $\gamma_1$ defining the orientation of said induced rotor EMF vector relative to the $\alpha$-axis.

9. The system of claim 8 with the provision of a reference slip frequency $\omega^*_2$, said slip calculator means being responsive to a frequency control signal $\omega_1$ derived from the error between $\omega_{2c}$ and $\omega^*_2$.

10. The system of claim 9 with said frequency control signal $\omega_1$ being used for adjusting said direct and quadrature voltage reference signals $u^*_{1x}$, $u^*_{1y}$, and with said frequency control signal $\omega_1$ being used to adjust said two orthogonal voltage reference signals $u^*_{1\alpha}$, $u^*_{1\beta}$ in relation to said direct and quadrature voltage references ($u^*_{1x}$, $u^*_{1y}$).

11. The system of claim 5 with said motor being responsive to a current source inverter controlled by a current regulator in accordance with two orthogonal current reference signals $i^*_{1\alpha}$ and $i^*_{1\beta}$ derived from direct and quadrature reference currents $i^*_{1x}$ and $i^*_{1y}$ in relation to the stator frequency and in accordance with the spatial argument angle $\gamma_1$ defining the orientation of said induced rotor EMF vector representation relative to the $\alpha$-axis.

12. The system of claim 11 with the provision of a stator current component reference signal $i^*_{1x}$, said stator current component calculator means being responsive to a frequency control signal representative of $\omega_1$ derived from the error between $i^*_{1x}$ and $i_{1x}$.

13. The system of claim 12 with said frequency control signal $\omega_1$ and said stator current components reference signal $i^*_{1x}$ being used, respectively, for adjusting said two orthogonal current reference signals $i^*_{1\alpha}$, $i^*_{1\beta}$ and said direct and quadrature reference currents $i^*_{1x}$, $i^*_{1y}$ in relation to the stator frequency $\omega_1$.

14. The system of claim 8 with means responsive to $\omega_1$, $E_{2\alpha}$ and $e_{2\beta}$ for calculating $\gamma_1$, the spatial argument angle defining the orientation of said induced rotor EMF vector representation relative to the $\alpha$-axis and for generating a signal representative of $\gamma_1$.

15. The system of claim 11 with means responsive to $\omega_1$, $e_{2\alpha}$ and $e_{2\beta}$ for calculating $\gamma_1$, the spatial argument angle defining the orientation of said induced rotor EMF vector representation relative to the $\alpha$-axis and for generating a signal representative of $\gamma_1$.

16. The system of claim 8 with integrator means responsive to $\omega_1$ for providing a signal representative of $\gamma_1$, the spatial argument angle defining the orientation of said induced rotor EMF vector representation relative to the $\alpha$-axis and for generating a signal representative of $\gamma_1$.

17. The system of claim 11 with integrator means responsive to $\omega_1$ for providing a signal representative of $\gamma_1$, the spatial argument angle defining the orientation of said induced rotor EMF vector representation relative to the $\alpha$-axis and for generating a signal representative of $\gamma_1$.

18. The system of claim 1 with said motor being responsive to a current source inverter including an AC line converter, a DC link and a motor side converter, said motor side converter being controlled in accordance with two orthogonal current reference signals $i^*_{1x}$ and $i^*_{1y}$ oriented, one relative to said induced rotor EMF vector representation, the other relative to the rotor flux linkage perpendicular thereto, and being controlled in relation to the spatial argument angle $\gamma_1$ defining the orientation of said induced rotor EMF vector representation relative to the $\alpha$-axis.

19. The system of claim 18 with means responsive to $\omega_1$, $e_{2\alpha}$ and $e_{2\beta}$ for calculating $\gamma_1$, the spatial argument angle defining the orientation of said induced rotor EMF vector representation relative to the $\alpha$-axis and for generating a signal representative of $\gamma_1$.

20. The system of claim 8 with integrator means responsive to $\omega_1$ for providing a signal representative of $\gamma_1$, the spatial argument angle defining the orientation of said induced rotor EMF vector representation relative to the $\alpha$-axis and for generating a signal representative of $\gamma_1$.

21. The system of claim 18 with said motor side converter being controlled in accordance with the arc tangent $\gamma_z$ defined by current reference signals $i^*_{1x}$ and $i^*_{1y}$, said $\gamma_z$ angle being summed with the $\gamma_1$ angle for control thereof.

22. The system of claim 21 with said AC line converter including a DC link current regulator responsive to the magnitude of the vectorial sum of the current reference signals $i^*_{1x}$ and $i^*_{1y}$.

23. The system of claim 8 with the spatial argument $\gamma_1$ derived from the stator frequency $\omega_1$ in accordance with the formula $\dot{y}_1 = \omega_1$, the phase voltages being determined as a function of $\sin \gamma_1$ and $\cos \gamma_1$.

24. The system of claim 18 with the spatial argument $\gamma_1$ being derived from said rotational EMF rotor vector.

25. The system of claim 18 with $\gamma_1$ being computed from the arc tangent of $e_{2\beta}/e_{2\alpha}$.

26. The system of claim 18 with $\gamma_1$ being computed from arc cosine $e_{2\alpha}/\sqrt{e_{2\alpha}^2 + e_{2\beta}^2}$ and in relation to the sign of $e_{2\alpha}$, $e_{2\beta}$ and $\omega_1$.

27. the system of claim 2 with the rotational EMF rotor vector being computed by calculating $e_{2\alpha}^2 + e_{2\beta}^2$.

28. The system of claim 18 with said motor side converter being controlled in accordance with the angle $\gamma_1$ plus a supplementary angle $\gamma_z$ indicative of the angular displacement of the reference stator current vector ($i^*_{1x}$, $i^*_{1y}$) relative to said induced rotor EMF vector.

29. The system of claim 28 with said reference stator current vector being determined from the DC link current magnitude during the conducting period of said motor side converter.

30. The system of claim 29 with means for measuring the DC link current $i_{zk}$, said line side converter being controlled in relation to said DC link current $i_{zk}$ and in relation to the magnitude of the reference stator current magnitude.

31. The system of claim 4 with the provision of a stator frequency regulator responsive to the frequency error between a signal proportional to the desired stator frequency $\omega^*_1$ and said $\omega_1$ signal for providing slip frequency reference signal $\omega^*_2$, and with means responsive to said slip frequency $\omega_{2c}$ and to said slip frequency reference signal $\omega^*_2$ for providing a control signal for said $\omega_1$ signal providing means.

32. The sytem of claim 31 with means responsive to said frequency error signal and operative in a predetermined zero zone mode for providing a minimum rate of change $(d\omega_1/dt)$ min and slip frequency providing means being disabled when the condition $|\omega_1| \leq a\omega_{1N}$ is satisfied, where $a\omega_{1N}$ is a minimum value for $\omega_1$ defining said zero zone about $\omega_1 = 0$; and with said minimum rate of change providing means becoming operative when in said zero zone mode to provide a signal substituted for said control signal when said condition is satisfied.

33. The system of claim 32 with a second zone wider than said predetermined zero zone, said second zone being defined by the condition $|\omega_1| \leq b\omega_{1N}$ where $b > a$ and means operative at the entry of said second zone and responsive to said $\omega_1$ signal and to said $\Delta\omega_1$ signal for storing said control signal when said second zone is being traversed to meet the desired stator frequency $\omega^*_1$, said $\omega_1$ signal providing means being operative with said stored control signal when traversing said stored zone; and with said minimum rate of change providing means being operative in said zero zone mode when $\Delta\omega_1 = 0$ and when $\omega_1 = 0$, within said zero zone.

* * * * *